(12) United States Patent
Dalsgaard et al.

(10) Patent No.: US 8,145,135 B2
(45) Date of Patent: Mar. 27, 2012

(54) APPARATUS, METHOD AND COMPUTER PROGRAM PRODUCT PROVIDING AUTOMATICALLY ADJUSTED TIME PERIODS USED FOR EVENT EVALUATION

(75) Inventors: Lars Dalsgaard, Oulu (FI); Sari Nielsen, Espoo (FI); Jarkko Koskela, Oulu (FI)

(73) Assignee: Nokia Corporation, Espoo (FI)

( * ) Notice: Subject to any disclaimer, the term of this patent is extended or adjusted under 35 U.S.C. 154(b) by 1077 days.

(21) Appl. No.: 11/591,966

(22) Filed: Nov. 2, 2006

(65) Prior Publication Data

US 2007/0129017 A1 Jun. 7, 2007

Related U.S. Application Data

(60) Provisional application No. 60/733,158, filed on Nov. 2, 2005.

(51) Int. Cl.
*H04B 17/00* (2006.01)
(52) U.S. Cl. ............... 455/67.11; 455/67.13; 455/63.1; 455/69; 455/522
(58) Field of Classification Search .......... 455/437, 455/574, 67.11, 67.13, 63.1, 69, 522
See application file for complete search history.

(56) References Cited

U.S. PATENT DOCUMENTS

| | | | |
|---|---|---|---|
| 6,445,917 B1 * | 9/2002 | Bark et al. | 455/423 |
| 7,167,709 B2 * | 1/2007 | Schwarz et al. | 455/436 |
| 7,272,395 B2 * | 9/2007 | Pedraza et al. | 455/436 |
| 2002/0006805 A1 * | 1/2002 | New et al. | 455/525 |
| 2002/0068571 A1 * | 6/2002 | Ohlsson et al. | 455/442 |
| 2003/0045292 A1 * | 3/2003 | Kim | 455/437 |
| 2003/0137969 A1 * | 7/2003 | Abdesselem et al. | 370/350 |
| 2003/0148800 A1 * | 8/2003 | Lee | 455/574 |
| 2003/0153369 A1 * | 8/2003 | Laiho et al. | 455/574 |
| 2004/0043769 A1 * | 3/2004 | Amerga et al. | 455/437 |
| 2004/0043798 A1 * | 3/2004 | Amerga et al. | 455/437 |
| 2004/0097233 A1 * | 5/2004 | Pecen et al. | 455/437 |
| 2005/0153751 A1 * | 7/2005 | Bultan et al. | 455/574 |
| 2005/0195760 A1 * | 9/2005 | Lee et al. | 370/312 |

FOREIGN PATENT DOCUMENTS

| | | |
|---|---|---|
| EP | 1 587 335 A1 | 10/2005 |
| EP | 1641297 A1 | 3/2006 |
| EP | 1677564 A1 | 7/2006 |

OTHER PUBLICATIONS

"Technical Specification Group Radio Access Network; Requirements for support of radio resource management (FDD) (Release 7)," 3GPP TS 25,133 V7.6.0 (Dec. 2006), pp. 1-206.

* cited by examiner

*Primary Examiner* — Edward Urban
*Assistant Examiner* — Ganiyu Hanidu
(74) *Attorney, Agent, or Firm* — Harrington & Smith

(57) ABSTRACT

A method includes determining a first time period during which evaluation should be performed of whether a received radio frequency signal meets at least one criterion, the first time period based at least partially on a second time period of discontinuous reception or transmission. The method also includes performing the evaluation of the received radio frequency signal using measurements obtained within the first time period, and determining, based on the evaluation, whether an event should be triggered. The method further includes triggering the event in response to a determination that the event should be triggered.

25 Claims, 6 Drawing Sheets

APPARATUS, METHOD AND COMPUTER PROGRAM PRODUCT PROVIDING AUTOMATICALLY ADJUSTED TIME PERIODS USED FOR EVENT EVALUATION

CROSS-REFERENCE TO RELATED APPLICATIONS

The present application claims the benefit under 35 U.S.C. §119(e) of U.S. Provisional Patent Application No. 60/733,158, filed on Nov. 2, 2005, the disclosure of which is hereby incorporated by reference in its entirety.

TECHNICAL FIELD

The exemplary and non-limiting embodiments of this invention relate generally to wireless communication systems and, more specifically, relate to techniques for user equipment to measure signals and report the measurements to a wireless network, including when it is necessary to report some measurements and events related to the measurements.

BACKGROUND

Certain abbreviations that are found herein are defined as follows:
3GPP third generation partnership project
UE user equipment
NW network
DRX discontinuous reception
DTX discontinuous transmission
PS packet scheduling
NC network controlled
LTE long term evolution
RRC radio resource control
RNC radio network controller
DCH dedicated channel One potential problem related to current discontinuous reception/transmission and packet scheduling concepts being developed is that these concepts are based on a very flexible discontinuous reception/transmission and packet scheduling scheme to allow the user equipment to save power when neither data reception (RX) nor transmission (TX) is scheduled for the user equipment. The user equipment typically enters a discontinuous mode (e.g., as opposed to a continuous mode) of reception or transmission. Discontinuous data reception typically means that neighbor cell measurements performed by the user equipment are also impacted, as user equipment-based measurements (e.g., especially intra-frequency measurements) normally are scheduled in the user equipment to be performed at the same time that reception or transmission is to occur. This scheduling is due to power saving. A current packet scheduling scheme has a side effect that the user equipment-based measurement can occur in an unpredictable manner.

As it is expected that in the LTE (also called 3.9G) concept, no RRC state change is required for the user equipment to begin using discontinuous reception/transmission, the change of certain parameter (such as Time-to-Trigger or Treselection parameters, described below) values generally should not be simply tied to state changes. Instead, another approach is required. The foregoing problems have not yet been addressed in 3.9G.

However, previously in 2G and 3G systems the same or a similar problem has been addressed. In 3G, where Time-to-Trigger and Treselection parameters and concepts were introduced, there is no RRC state, where the user equipment is occasionally required to receive data without interruption due to discontinuous reception (e.g., DRX) and while during some other moments it is allowed to use discontinuous reception for power saving purposes. This means that power saving benefits can be achieved without state transitions.

In the 2G systems, the measurement reporting by the user equipment in a dedicated mode is periodic and is based on time. In this state, no hysteresis or Time-to-Trigger approach is used. For example, a measurement report is sent every 0.48 second (excluding a Fast Power Control operation, which is also timer based). In a case where the user equipment is GPRS attached, the user equipment may be ordered to perform network controlled measurements. In this case, the measurement reporting to the network is controlled by a NC_REPORTING_PERIOD timer. This timer may vary depending on whether the user equipment is in transfer or idle mode. The timer value given by the network is used by the user equipment until a new value is received, with the exception that if the time for reporting in idle is shorter than the discontinuous reception time, the user equipment uses the discontinuous reception time as the reporting time interval.

3G measurement reporting may be based on an event trigger, which also includes a Time-to-Trigger parameter for some short time-domain "hysteresis". Without the Time-to-Trigger parameter, a user equipment would immediately report a measurement (e.g., of power level of a signal being received) when the measurement meets certain criteria, which typically involves the measurement (or measurements) being beneath some threshold for some period of time. The Time-to-Trigger parameter provides a time period during which an evaluation may be made as to whether the measurement meets the criteria. This Time-to-Trigger time period therefore reduces reporting of events caused when, e.g., a signal level temporarily dips below a threshold. The Time-to-Trigger parameter is signaled to the user equipment by the network. The network signals only one Time-to-Trigger parameter at a time, and the user equipment uses that parameter until a new Time-to-Trigger parameter value is signaled to the user equipment.

In addition to the Time-to-Trigger parameter for event-triggered reporting in the CELL_DCH, 3G has the Treselection parameter for cell reselection purposes in the Idle mode and the CELL_PCH, URA_PCH and CELL_FACH states. The Treselection parameter is broadcast to the user equipment in the System Information. In the first releases of 3G, one Treselection parameter was defined for the Idle mode and another for RRC-connected modes, where cell reselections are performed (i.e., CELL_PCH, URA_PCH and CELL_FACH). In the later releases, CELL/URA_PCH and CELL_FACH Treselection parameters were separated from each other, such that during CELL_PCH/URA_PCH states the user equipment may utilize discontinuous reception, and in the case of discontinuous reception the user equipment does not perform continuous measurements. The discontinuous reception cycle length is also likely to affect the measurement activity, as allowed by 3GPP TS 25.133. In the CELL_FACH state, however, the user equipment cannot utilize discontinuous reception and the continuous neighbor measurements are also required.

While all of these different parameters and corresponding time periods used for evaluation are useful, it is beneficial to adjust the parameters and corresponding time periods in ways not previously performed.

BRIEF SUMMARY

In an exemplary embodiment of the invention, a method is disclosed that includes determining a first time period during which evaluation should be performed of whether a received radio frequency signal meets at least one criterion, the first time period based at least partially on a second time period of discontinuous reception or transmission. The method also includes performing the evaluation of the received radio frequency signal using measurements obtained within the first time period, and determining, based on the evaluation, whether an event should be triggered. The method further includes triggering the event in response to a determination that the event should be triggered.

In an additional embodiment, a computer program product is disclosed that tangibly embodies a program of machine-readable instructions executable by a digital processing apparatus to perform operations. The operations include determining a first time period during which evaluation should be performed of whether a received radio frequency signal meets at least one criterion. The first time period is based at least partially on a second time period of discontinuous reception or transmission. The operations also include performing the evaluation of the received radio frequency signal using measurements obtained within the first time period. The operations further include determining, based on the evaluation, whether an event should be triggered, and triggering the event in response to a determination that the event should be triggered.

In another exemplary embodiment, an apparatus is disclosed that comprises circuitry configured to determine a first time period during which evaluation should be performed of whether a received radio frequency signal meets at least one criterion. The first time period is based at least partially on a second time period of discontinuous reception or transmission. The circuitry is configured to perform the evaluation of the received radio frequency signal using measurements obtained within the first time period. The circuitry is further configured to determine, based on the evaluation, whether an event should be triggered, and to trigger the event in response to a determination that the event should be triggered.

In another exemplary embodiment, a method is disclosed that includes, in order to perform an evaluation of whether a received radio frequency signal meets at least one criterion, using a first time period for performing the evaluation in a continuous mode and a second time period for performing the evaluation in a discontinuous mode. The method includes in response to being in the continuous mode, performing the evaluation of the received radio frequency signal using measurements corresponding to the first time period and, in response to being in the discontinuous mode, performing the evaluation of the received radio frequency signal using measurements corresponding to the second time period. The method also includes determining, based on the evaluation, whether an event should be triggered, and triggering the event in response to a determination that the event should be triggered.

BRIEF DESCRIPTION OF THE DRAWINGS

The foregoing and other aspects of embodiments of this invention are made more evident in the following Detailed Description of Exemplary Embodiments, when read in conjunction with the attached Drawing Figures, wherein.

DETAILED DESCRIPTION OF EXEMPLARY EMBODIMENTS

In order to ensure that user equipment reporting and, potentially, also cell reselections and handover operations are correctly triggered under time variant radio conditions, both in the discontinuous reception/transmission cases and in cases where continuous neighbor measurements are required, it would be desirable to have different time domain hysteresis characteristics for triggering handover events to the network and, potentially, also cell reselections (depending on the selected concept in 3GPP). One reason for this approach (as described in more detail in reference to FIG. 2) would be to ensure that potential triggers would not be based on, e.g., only one measurement sample, a condition that could possibly occur if the user equipment is using, e.g., a long discontinuous reception cycle and a short Time-to-Trigger value. Further, it can be noted that, from a system perspective, it is desirable to define different Treselection parameters for both the discontinuous reception case and the non-discontinuous reception case (e.g., the continuous reception case). Additionally, the network may tune its Treselection parameter value for the selected discontinuous reception cycle.

It is noted that primary disclosure herein is placed on the Time-to-Trigger parameter. However, aspects of the disclosed invention are also application to other items (such as parameters and associated values) controlling time periods during which an evaluation of a signal is to be performed, such as the Treselection parameter and packet scheduling.

Figure 1:
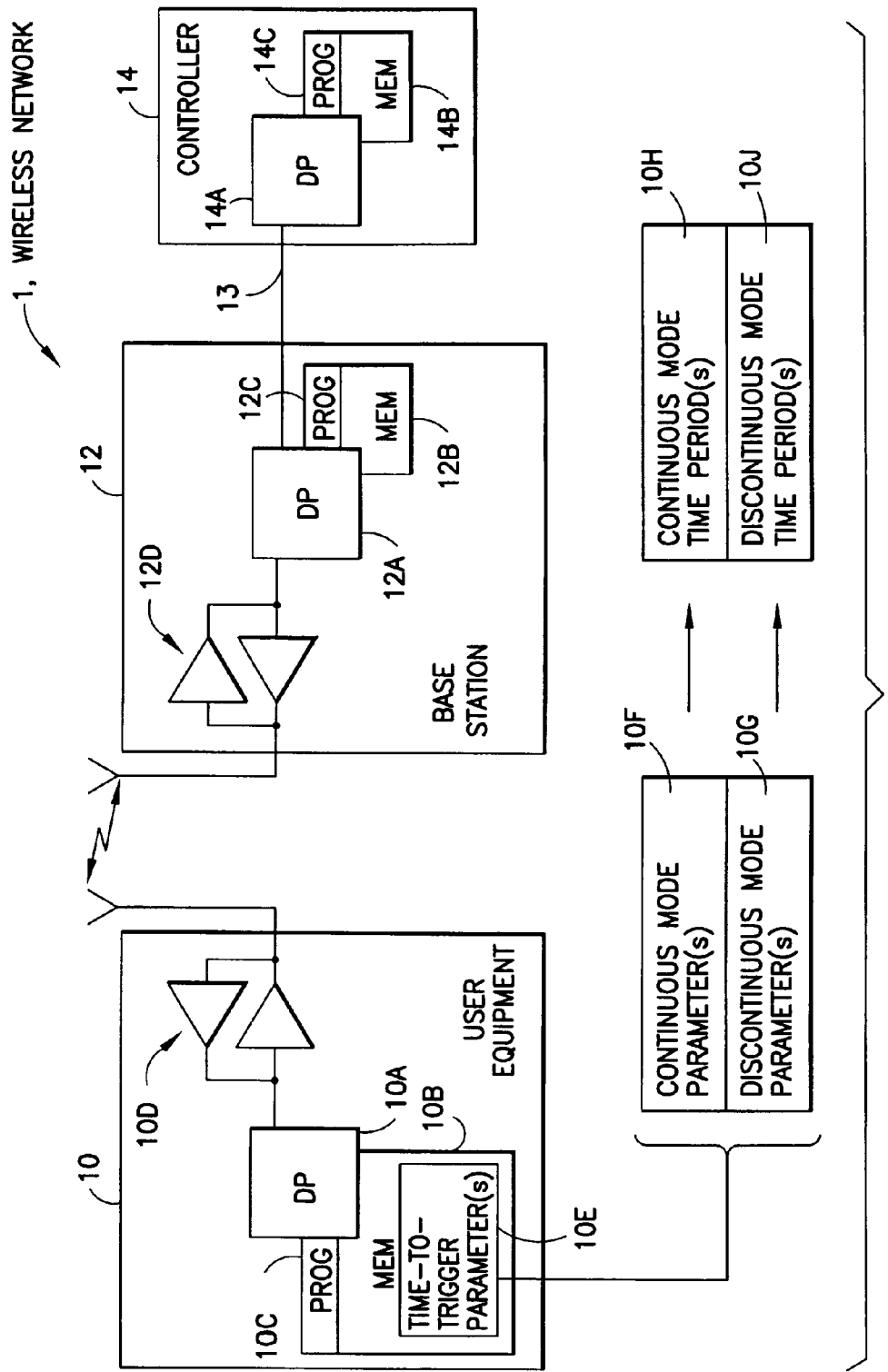
FIG. 1 shows a simplified block diagram of various electronic devices that are suitable for use in practicing the exemplary embodiments of this invention.

Reference is made first to FIG. 1 for illustrating a simplified block diagram of various electronic devices that are suitable for use in practicing the exemplary embodiments of this invention. In FIG. 1, a wireless network 1 is adapted for bidirectional communication with a user equipment 10 via a base station 12 (e.g., a Node B, base transceiver station). Also shown is an exemplary controller 14 (e.g., an RNC, base station controller) of the wireless network 1. The user equipment 10 includes a data processor (DP) 10A, a memory (MEM) 10B that stores a program (PROG) 10C, and a suitable radio frequency (RF) transceiver 10D for bidirectional wireless communications with the base station 12, which also includes a data processor 12A, a memory 12B that stores a program 12C, and a suitable RF transceiver 12D. The base station 12 is coupled via a data path 13 to the controller 14 that also includes a data processor 14A and a memory 14B storing an associated program 14C. The programs 10C, 12C, and 14C are assumed to include any program instructions that, when executed by the associated data processor, enable the electronic device to operate in accordance with the exemplary embodiments of this invention, as will be discussed below in greater detail.

The user equipment 10 also includes Time-to-Trigger parameter(s) 10E, which in an exemplary embodiment include continuous mode parameter(s) 10F and discontinuous mode parameter(s) 10G. In an exemplary embodiment, the user equipment 10 uses the continuous mode parameter(s) 10F to determine corresponding continuous mode time period(s) 10H that are used during evaluation of events for the continuous mode. Similarly, the user equipment 10 uses the discontinuous mode parameter(s) 10G to determine corresponding discontinuous mode time period(s) 10J that are used during evaluation of events for the discontinuous mode. The evaluations correspond to one or more radio frequency signals. The events include, e.g., measurement reporting, cell reselection operations, and handover operations. In one example, a time period 10H has a value different from a time period 10J. In another example, there are multiple discontinuous mode parameters 10G, each discontinuous mode parameter 10G corresponding to one or more discontinuous cycles. In other examples, the parameters 10F or 10G are equivalent to the time periods 10H, 10J, and the time periods 10H, 10J are not used. These concepts are explained in more detail below.

In general, the various embodiments of the user equipment 10 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The embodiments of this invention may be implemented by computer software executable by the data processor 10A of the user equipment 10 and the other data processors, or by hardware, or by a combination of software and hardware. It is also noted that the memories 10C, 12C, and 14C can include a computer program product tangibly embodying a program of machine-readable instructions executable by a digital processing apparatus to perform operations herein. The computer program product may also include compact disks, digital versatile disks, memory sticks, and any other device for holding information.

The memories 10B, 12B, and 14B may be of any type suitable to the local technical environment and may be implemented using any suitable data storage technology, such as semiconductor-based memory devices, magnetic memory devices and systems, optical memory devices and systems, fixed memory and removable memory. The data processors 10A, 12A, and 14A may be of any type suitable to the local technical environment, and may include one or more of general purpose computers, special purpose computers, microprocessors, digital signal processors (DSPs) and processors based on a multi-core processor architecture, as non-limiting examples.

Figure 2:
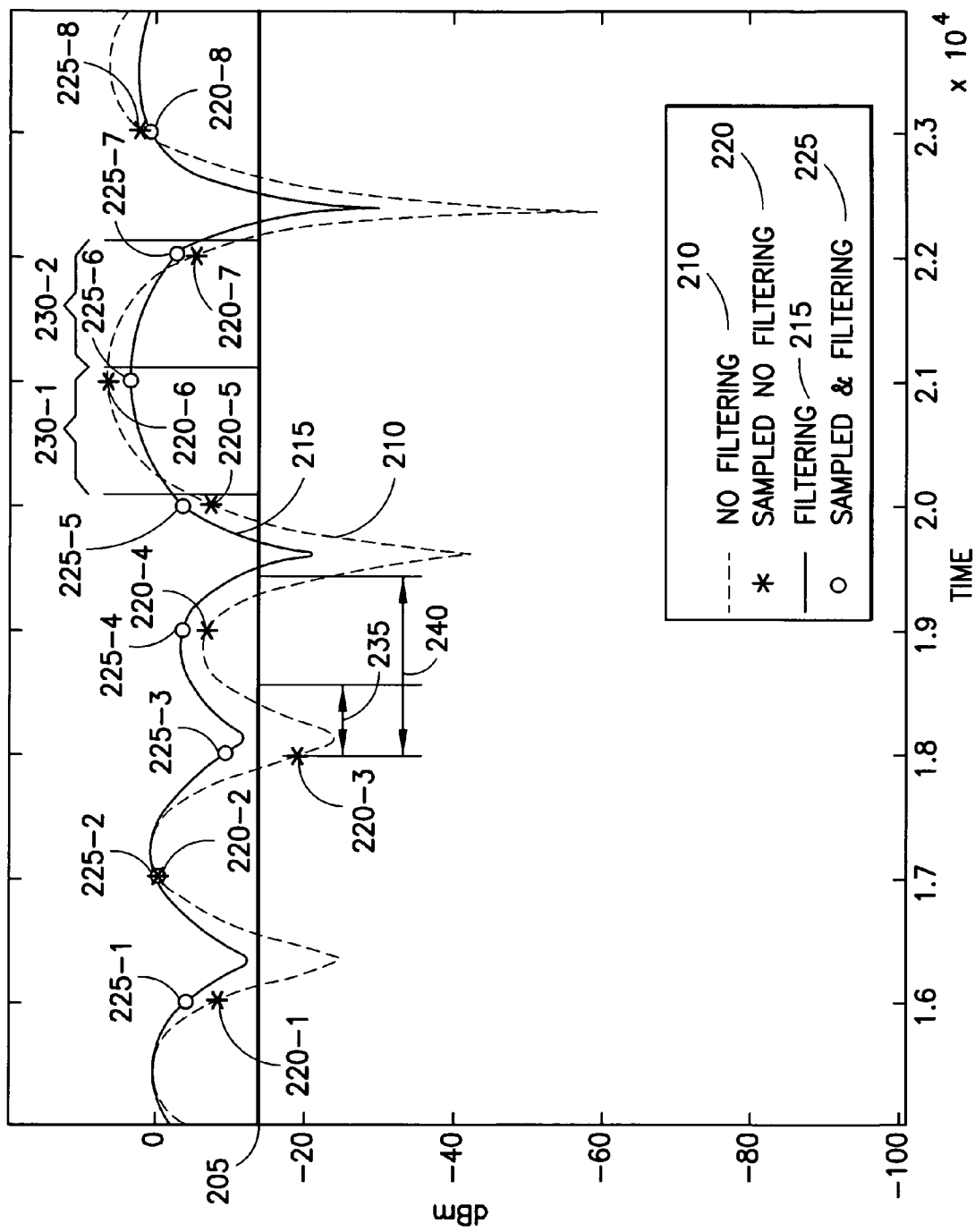
FIG. 2 is a graph that illustrates how event-triggered reporting may behave differently if a Time-to-Trigger type of time hysteresis is not adjusted to discontinuous reception/transmission cycles.

FIG. 2 illustrates a manner in which events may be reported to the network differently if the same Time-to-Trigger value is used both for the non-discontinuous reception and discontinuous reception cases. In FIG. 2, the following information is shown: a graph 210 of continuous measurements without filtering; a plot of samples 220, including samples 220-1 through 220-8, that is a sampled version of graph 210; a graph 215 of continuous measurements with filtering; and a plot of samples 225, including samples 225-1 through 225-8, that is a sampled version of graph 215. The time scale is in terms of sample counts, but the time scale could be expressed in seconds, milliseconds, etc. It is noted that the filtered version may be produced by using analog filter(s), digital filter(s), or both. The graphs 210, 215 represent signal levels (in this case, power levels) for a signal being examined by the user equipment 10, such as a signal corresponding to a channel from a cell being observed by the user equipment 10. During continuous or discontinuous modes, the user equipment 10 could be observing channels from the cell to which the user equipment 10 is currently assigned or to other cells.

Typically, a Time-to-Trigger parameter has a value equivalent to the time period 235, and the Time-to-Trigger parameter is given by the network 1 to the user equipment 10. It is shown below that it is beneficial to determine further a Time-to-Trigger parameter based on a discontinuous cycle in a discontinuous mode. In a discontinuous mode, typically no continuous reception (e.g., to the user) or transmission (e.g., from the user) of data is occurring. Signal level measurements will generally occur at pre-determined time intervals e.g. continuously if continuous data transmission is ongoing or discontinuously (e.g. at every DRX timeout) if data transmission is discontinuous. For instance, a user equipment 10 will generally estimate the power level of certain pilots (e.g., pilot symbols) which are transmitted from base stations 12 with known power level. In this example, the Time-to-Trigger parameter based on a discontinuous cycle has a value equivalent to the time period 240. Two exemplary discontinuous cycles 230-1 and 230-2 are shown, although each sample 220, 225 corresponds to a discontinuous cycle. The user equipment 10 is in the discontinuous mode of reception (e.g., or transmission) during the discontinuous cycles 230-1 and 230-2. It is noted that the discontinuous cycles 230 can be equivalent to discontinuous states of the user equipment 10. However, as described above, some implementations such as 3.9G do not use discontinuous states and therefore state transitions are not useful for determining time periods such as time period 240.

During the discontinuous cycles 230, power level determinations are made for the signals corresponding to the graph 210, 215. The power level determinations correspond to samples 220-6 and 225-6 in discontinuous cycle 230-1 and samples 220-7 and 225-7 in discontinuous cycle 230-2. It is noted that other characteristics of signals may also be used, such as signal-to-noise ratios.

One exemplary aspect of this invention is to assure that the Time-to-Trigger period is based on the currently used/ordered discontinuous reception/transmission period. This implies that the Time-to-Trigger timer is made a function of the discontinuous reception/transmission cycle 230 (e.g., is made a function of a possible user equipment sleep interval).

More specifically, FIG. 2 illustrates how event-triggered reporting may behave differently if Time-to-Trigger type of time hysteresis is not adjusted to the discontinuous reception/transmission cycles. The continuous graphs 210, 215 represent cases where no discontinuous reception is used (i.e., continuous measurements are made in a continuous mode) and the '*' and 'o' samples 220, 225 (respectively) represent discontinuous measurements due to discontinuous reception. The sampling rate of the samples 220, 225 may be assumed for convenience to be the same as the length of a discontinuous reception cycle 230.

That is, FIG. 2 shows how event-triggered reporting with Time-to-Trigger time domain hysteresis may vary between continuous and discontinuous measurement modes of operation, unless the Time-to-Trigger value is adjusted to correspond to the discontinuous reception cycle 230. Continuous measurements without filtering (e.g., illustrated by graph 210) would not trigger an event by the user equipment to the network, because the time period 235 (corresponding to a Time-to-Trigger parameter) includes a signal power level above the threshold 205. In other words, the evaluation of the signal corresponding to the graph 210 over the time period 235 would not cause an event such as reporting the measurement. However, sampled results without filtering would trigger an event. This is true because the only sample 220-3 in the time period 235 is beneath the threshold 205, and an evaluation of the signal 210 in this period would indicate too low of a power level.

In accordance with exemplary embodiments of this invention, by making the Time-to-Trigger time value dependent on the current discontinuous reception/transmission cycle 230 it can be assured that for whatever measurement reporting operation(s) that depend on the Time-to-Trigger time, the user equipment 10 is always capable of obtaining a minimum number of necessary measurements, even when utilizing discontinuous reception (and DTX) for power saving purposes. Thus, the time period 240 is based on the discontinuous cycle 230, as is described in more detail below. Because the time period 240 includes the sample 220-4, an evaluation of power level of the signal 210 typically would not indicate that power level was beneath the threshold 205. It should be noted that the evaluation might depend on the particular algorithm being used. It should be kept in mind that neighbor measurements are normally continuously performed by the user equipment 10 when the user equipment 10 is awake due to the reception and transmission of data. This is especially true for intra-frequency measurements in a frequency reuse=1 ("reuse equals one") system.

If the Time-to-Trigger value is too short compared to the interval when the user equipment 10 performs measurements of power levels of signals from identified cells, the Time-to-Trigger would not provide any additional time domain hysteresis to the filtered and sampled measurement results (e.g., samples 220). However, when the user equipment 10 is continuously active (i.e., in the continuous state, as illustrated by graphs 210, 215), and also makes accurate measurements, there is generally no need to have a long Time-to-Trigger value. Furthermore, it is desirable to avoid unnecessarily long Time-to-Trigger values when the user equipment 10 performs continuous neighbor measurements in order to keep handover delays as short as possible. Otherwise, handover performance may be degraded unnecessarily.

It should be noted that the evaluation (and corresponding criteria requirements) might depend on the particular algorithm being used. For instance, it is possible that an event-driven handover procedure could be implemented by the user equipment 10 conducting handover measurements periodically with a "measurement interval". The collected measurements results might be averaged over a sliding window, with a "sliding window size". New averaged measurement results are always obtained after a step of a "sliding window step". If the averaged measurement results satisfy given handover evaluation criteria continuously for "Time-to-Trigger" period of time, the user equipment 10 will send a measurement report to the network, which then initiates the actual hard handover execution.

It is noted that the time period 235 shown in FIG. 2 could be considered herein as a continuous mode time period 10H, and the time period 240 could be considered a discontinuous mode time period 10J. This is true because typically the continuous mode time period 10H will be shorter than the discontinuous mode time period 10J.

In the current 3G concept, the Time-to-Trigger is based on a fixed value set by the network 1 (e.g., the base station 12 or controller 14) and signaled to (by the base station 12) the user equipment 10. The value may change over time, and may depend on the ongoing connection, but this requires explicit signaling between the network 1 and the user equipment 10. Additionally, the network 1 is not likely to have the necessary information for changing the Time-to-Trigger parameter unless, for example, a different parameter value is needed in certain cells due to special radio conditions.

In accordance with exemplary embodiments of this invention, the network 1 need not signal the Time-to-Trigger value to user equipment 10, but instead the user equipment 10 determines the value itself based on certain information, such as a current packet schedule or discontinuous reception/transmission schedule. The user equipment-determined Time-to-Trigger value(s) is shown stored in FIG. 1, for convenience, in the memory 10B of the user equipment 10. The manner in which the user equipment 10 defines its Time-to-Trigger parameter value in different cases is dependent on how the network 1 has set and/or signaled other relevant parameters that are used for defining the Time-to-Trigger parameter with no discontinuous reception/transmission, and with different discontinuous reception cycles 230. This implies that the network 1 has still has overall control and knowledge of the Time-to-Trigger parameter that the user equipment 10 uses.

There are a number of techniques for associating the Time-to-Trigger parameter value with the discontinuous reception cycle (including no discontinuous reception). These include, but need not be limited to, the following.

First, an algorithm may be defined in the relevant specifications for use by the user equipment 10 in calculating the Time-to-Trigger parameter value. This algorithm may have input parameters that are provided in the measurement control (e.g., broadcast type of measurement control or dedicated measurement control) message(s).

Second, different Time-to-Trigger parameter values may be given for different discontinuous reception cycles, but all of these values may be given at once in one measurement control message to avoid having to signal new parameter values when the user equipment 10 changes its discontinuous reception cycle.

This method of defining the Time-to-Trigger parameter reduces signaling overhead and allows the network 1 to use the same measurement control information for several or even all user equipments 10 that are active in the cell (or camped on the cell in the case where one considers as well the Treselection parameter for cell reselection).

Figure 3:
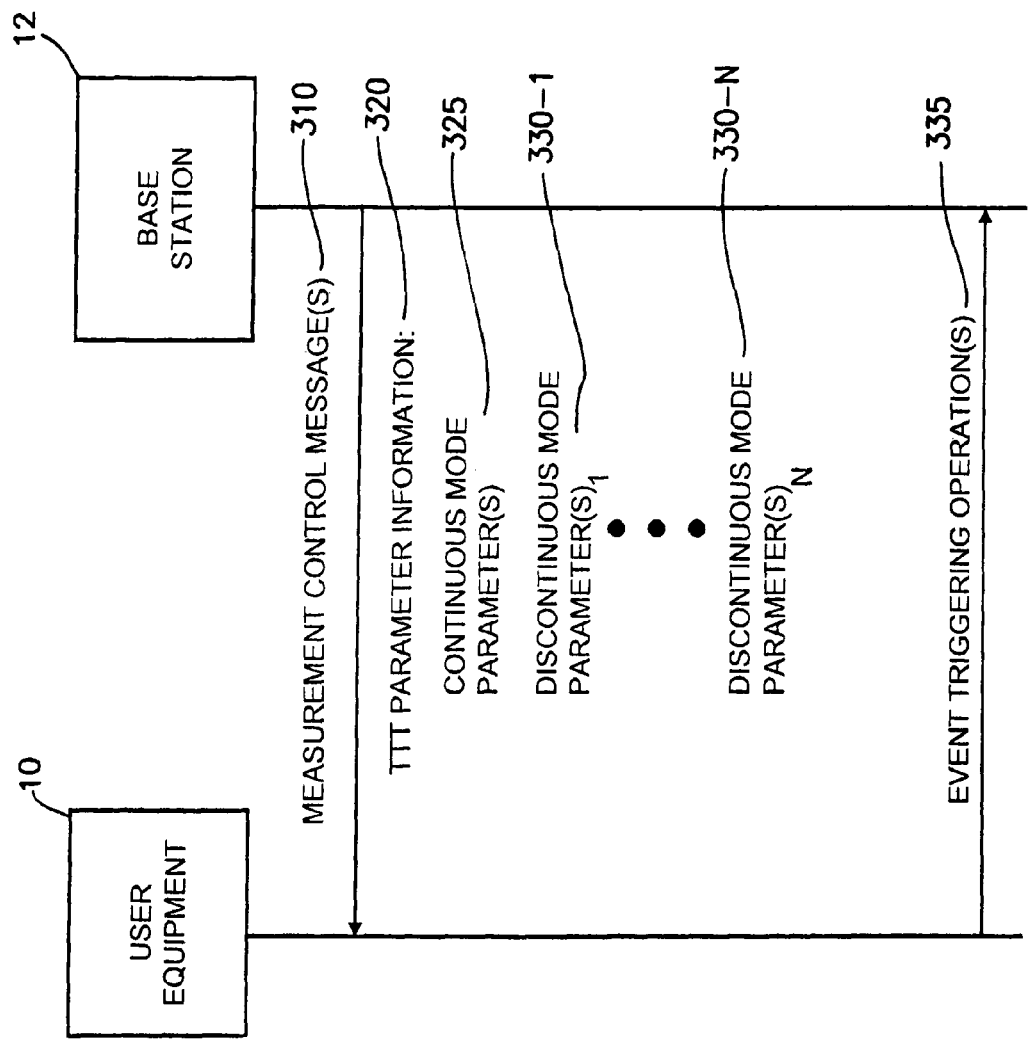
FIG. 3 illustrates exemplary communications between a base station and a user equipment.

For instance, FIG. 3 illustrates exemplary communications between a base station and a user equipment in accordance with the described techniques. In FIG. 3, the base station 12 (e.g., as directed by controller 14) sends measurement control message(s) 310 to the user equipment 10. The measurement control message(s) include Time-to-Trigger parameter information 320, which in this example includes continuous mode parameter(s) 325 and a number of discontinuous mode parameters 330-1 through 330-N. The user equipment 10 could store the parameters 325 as the parameters 10F and the parameters 330 as parameters 10G. The continuous state parameter(s) 325 is used to define a time period 10H for a Time-to-Trigger used for a continuous state. Similarly, the discontinuous state parameter(s) 330 is used to define a time period 10J for a Time-to-Trigger used for a discontinuous state. The user equipment 10, when an event is triggered due to evaluation during these time periods 10H, 10J, performs some event triggering operation(s) 335. Such operations could include, e.g., measurement reporting, cell reselection operations, and handover operations.

One non-limiting example of an algorithm for defining the Time-to-Trigger parameter values for no discontinuous reception/transmission and discontinuous reception cycle$_n$ is now provided:

Time-to-Trigger (No discontinuous reception/transmission)= X ms, where the value of X is given in the measurement control message 310; and Time-to-Trigger (discontinuous reception cycle$_n$)=a * discontinuous reception cycle$_n$ ms, where the value of a is given in the measurement control message 310. The value of a is generally greater than one.

Further in accordance with the exemplary embodiments of this invention, when the user equipment 10 begins using a certain discontinuous reception cycle 230 after continuous-reception and continuous measurements, the user equipment 10 may also automatically change the Time-to-Trigger value that the user equipment 10 uses in the event-triggered evaluation.

In the case of a non-regular discontinuous reception cycle 230 (e.g., the allocation table may include a 'jump'-pointer to a next continuum in the allocation table reading or a sudden decrease in the interval between reception of allocation tables), some additional adjustment may need to be made for the Time-to-Trigger parameter value (e.g., corresponding to time period 10J) so that the user equipment 10 does not need to change its Time-to-Trigger parameter value unnecessarily often.

Figure 4:
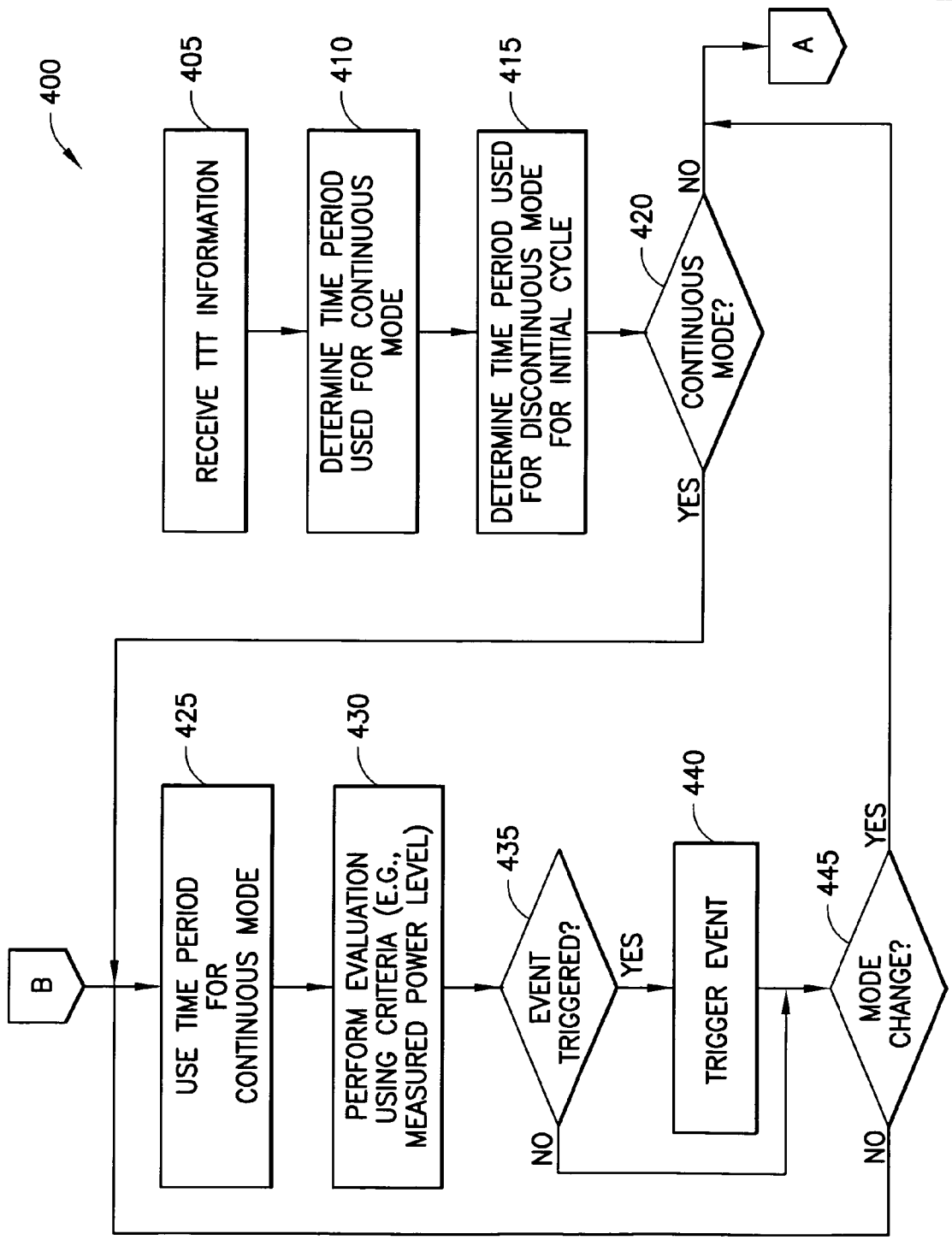
FIGS. 4 and 5 are flowcharts of an exemplary method performed by a user equipment for automatically adjusting a time period used for event evaluation.
Figure 5:
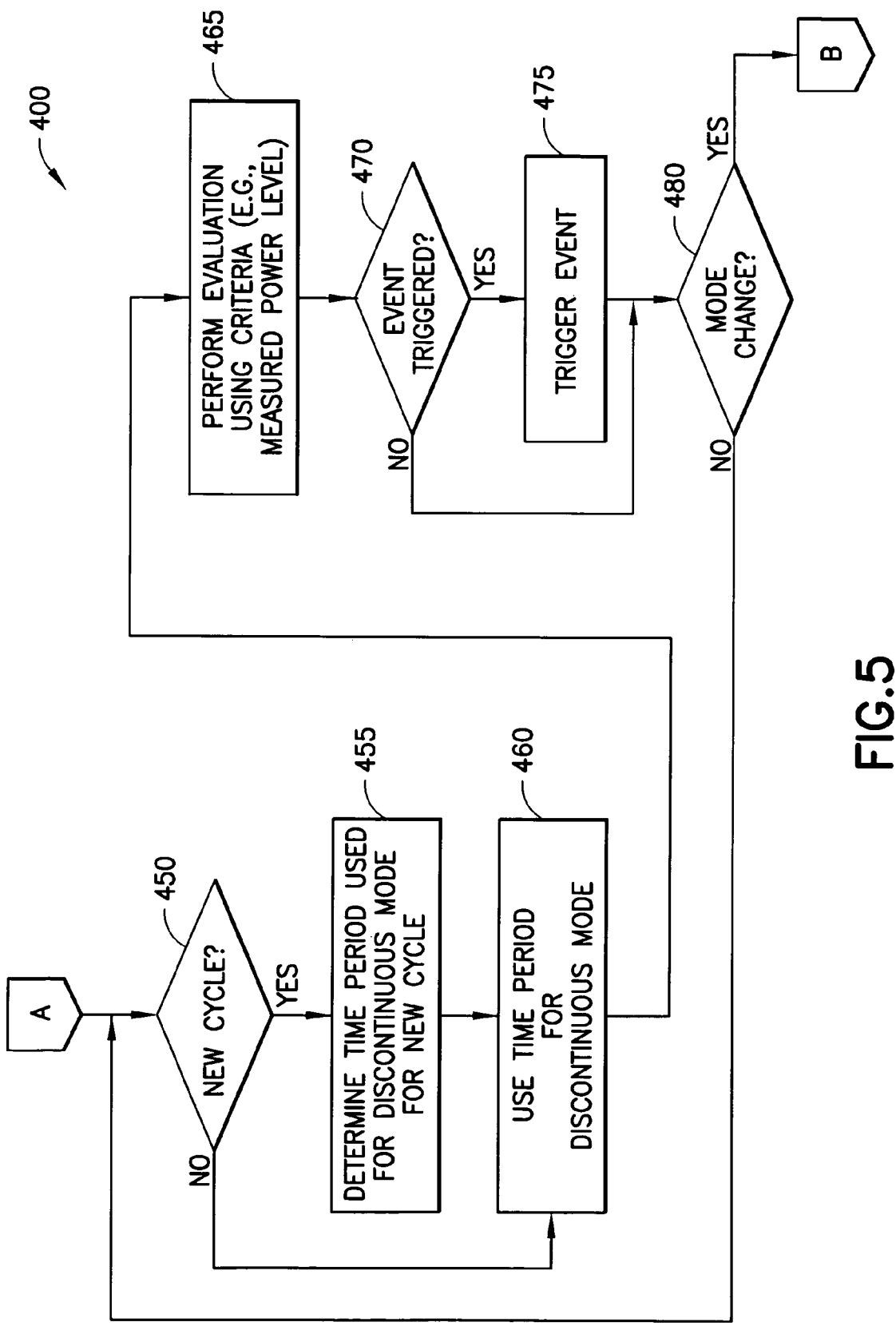

Turning to FIGS. 4 and 5, flowcharts are shown of an exemplary method 400 performed by a user equipment for automatically adjusting a time period used for event evaluation. Method 400 may be performed by program 10C in the user equipment 10 (but see also FIG. 6). In block 405, the user equipment 10 receives the Time-to-Trigger information. As shown in FIG. 3, the Time-to-Trigger information 320 is part of one or more measurement control messages 310, but FIG. 3 is merely one example. In block 410, the user equipment 10 uses the Time-to-Trigger information to determine a value of a Time-to-Trigger parameter for the continuous state. The value corresponds to, e.g., the time period 10H. In block 415, the user equipment 10 uses the Time-to-Trigger information 320 to determine a value of a Time-to-Trigger parameter for a discontinuous state for an initial discontinuous cycle. The value corresponds to, e.g., the time period 10J.

In block 420, it is determined if the user equipment is in a continuous mode of reception or transmission. A continuous mode may be considered equivalent to a continuous state of operation or any period during which reception/transmission occurs. If so (block 420=YES), the Time-to-Trigger parameter value is used for the continuous mode in block 425. In block 430, evaluation is performed using measured power level. The evaluation uses a threshold 205 and a continuous power level measured at least partially during the time period (e.g., time period 10H) indicated by the value of the Time-to-Trigger parameter for a continuous state. It is noted that the threshold 205 is one of several possible criteria that might be used for evaluation. For instance, the evaluation could include examining how long the signal exists above and below the threshold and making determinations based on these times. If the evaluation indicates an event should be triggered (block 435=YES), the event is triggered in block 440. If the evaluation does not indicate the event should be triggered (block 435=NO), the method 400 continues in block 445.

In block 445, it is determined if there has been a change from the continuous mode to a discontinuous mode. If not (block 445=NO), the method 400 continues in block 425. If so (block 445=NO), the method continues in block 450. Block 450 may also be reached when there is no continuous mode (block 420=NO).

In block 450, it is determined if there is a new discontinuous cycle (e.g., cycle 230). If so, a new value of a Time-to-Trigger for the new discontinuous cycle (and corresponding state) is determined using the Time-to-Trigger information. This occurs in block 455. In block 460, the value (e.g., indicating time period 10J) of the Time-to-Trigger for the discontinuous state is used. If there is no new cycle (block 450=NO), the value of the Time-to-Trigger is used for the "old" discontinuous state in block 460.

In block 465, evaluation is performed using measured power level. The evaluation typically uses a threshold 205 and a sample power level measured at least partially during the time period (e.g., time period 10J) indicated by the value of the Time-to-Trigger parameter (e.g., parameter 330 or 10G) for a discontinuous state. The threshold 205 is only one possible criterion and other criteria may be used. If the evaluation indicates an event should be triggered (block 470=YES), the event is triggered in block 470. If the evaluation does not indicate the event should be triggered (block 470=NO), the method 400 continues in block 480.

In block 480, it is determined if there is a change from the discontinuous mode to the continuous mode. If so (block 480=YES), the method 400 continues in block 425. Otherwise (block 480=NO), the method continues in block 450.

One advantage of the use of the exemplary embodiments of this invention is that it can be assured that the user equipment 10 will always have some minimum number of measurements available of evaluation events for reporting, even if the user equipment 10 uses discontinuous reception for power saving purposes. This again assures that the content of the report (which is used on the network 1 side for decision making) will be at some minimum quality level. In an exemplary embodiment, the Time-to-Trigger parameter provides time domain hysteresis with different discontinuous reception cycles.

Further, it is not necessary for the network to send an update to the Time-to-Trigger time every time the discontinuous reception/transmission interval changes, and yet still the network 1 has knowledge of and control over the user equipment 10 reporting behavior. Additionally, by providing an adjustable Time-to-Trigger parameter one can avoid delaying handovers unnecessarily when the user equipment 10 is capable of performing accurate continuous neighbor cell measurements.

In general, the various embodiments may be implemented in hardware (e.g., special purpose circuits, logic) or software, or any combination thereof. For example, some aspects may be implemented in hardware, while other aspects may be implemented in software such as firmware which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as hardware and software.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Figure 6:
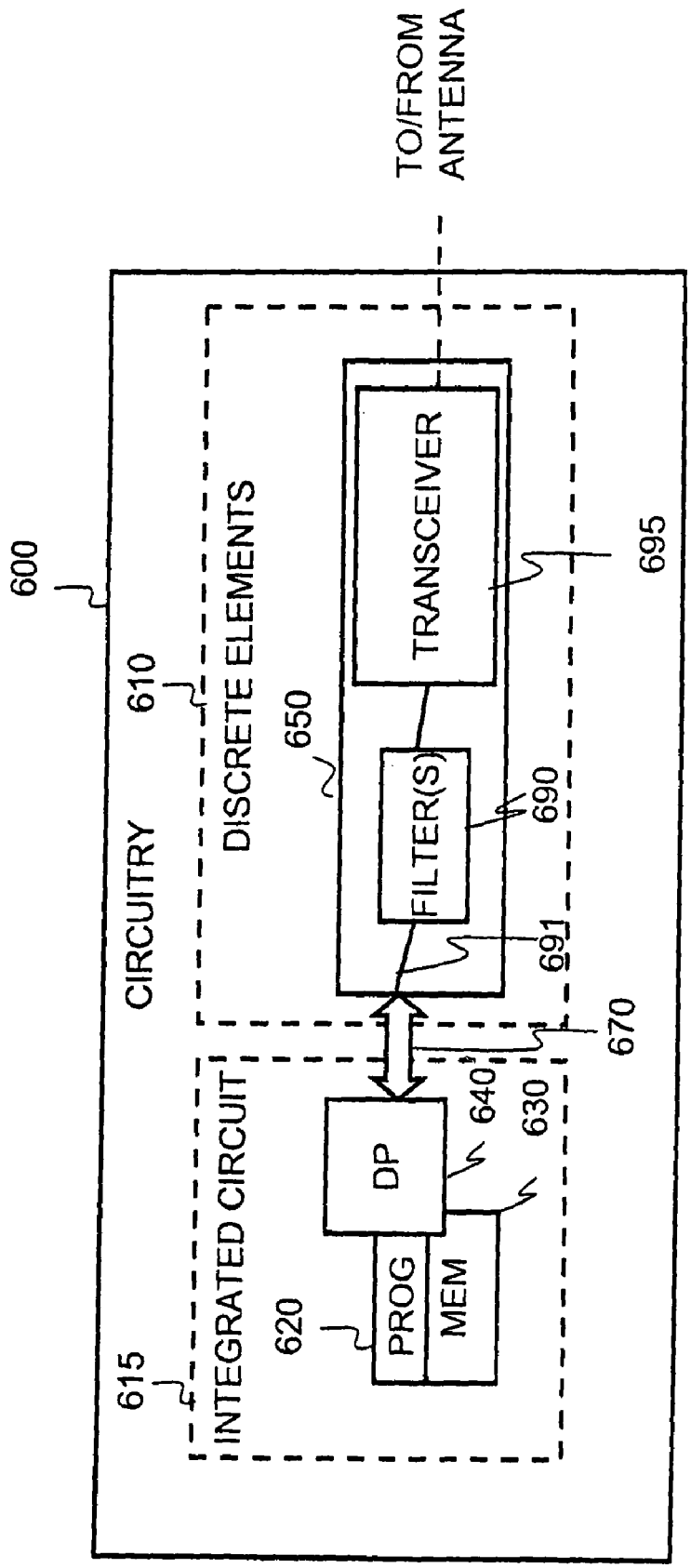
FIG. 6 is a block diagram of circuitry suitable for implementing embodiments of the disclosed invention.

As an example, in FIG. 6, circuitry is shown that is suitable for implementing embodiments of the disclosed invention. Circuitry 600 includes one or more data processors 640, one or more memories 630 including a program 620, a bus 670, and logic 650. In this example, logic 650 is part of discrete elements 610, and the data processor(s) 640 and one or more memories 630 are part of an integrated circuit 615. The logic 650 includes one or more filter(s) 690, e.g., used to create the filtered signal 691 (as shown in graph 215 of FIG. 2). The logic 650 also includes a transceiver 695 (e.g., transceiver 10D of FIG. 1), which is coupled to an antenna (not shown in FIG. 6) and the filter 690. The filter 690 may also be performed by program 620. Program 620 includes a set of instructions executable by the one or more data processors 640 to perform operations herein. The circuitry 600 could include multiple integrated circuits, and the logic 650 could be included on one of the integrated circuits.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention. For instance, although the techniques herein are now under discussion in 3GPP, the techniques are also applicable to other current or future systems and are not limited to the 3GPP.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
    during a connected mode between a user equipment and a base station, the user equipment determining a first time period during which evaluation should be performed of whether a received radio frequency signal meets at least one criterion, the first time period based at least partially on a second time period of discontinuous reception or transmission, wherein the first time period is longer than the second time period;
    during the connected mode, the user equipment performing the evaluation of the received radio frequency signal using measurements obtained within the first time period;
    determining, based on the evaluation, whether an event should be triggered; and
    triggering the event in response to a determination that the event should be triggered.

2. The method of claim 1, wherein the second time period corresponds to a time period of a discontinuous cycle.

3. The method of claim 2, further comprising modifying the first time period in response to a modification of the second time period of the discontinuous cycle.

4. The method of claim 2, further comprising receiving a plurality of parameters corresponding to a plurality of discontinuous cycles and selecting one of the parameters based on a current discontinuous cycle, and wherein determining a first time period further comprises determining the first time period using the selected parameter.

5. The method of claim 1, wherein the at least one criterion comprises a threshold and wherein performing the evaluation further comprises comparing the measurements to the threshold.

6. The method of claim 5, wherein the measurements comprise power level measurements.

7. The method of claim 1, wherein triggering the event comprises performing at least one of a measurement reporting operation, a cell reselection operation, or a handover operation.

8. The method of claim 1, wherein the time period of discontinuous reception corresponds to a discontinuous state of reception and the time period of discontinuous transmission corresponds to a discontinuous state of transmission.

9. The method of claim 1, further comprising receiving a parameter corresponding to the second time period, and wherein determining a first time period further comprises determining the first time period using the parameter.

10. The method of claim 9, wherein the parameter comprises a value and wherein determining the first time period further comprises determining the first time period by multiplying the value by a length of time corresponding to the second time period.

11. The method of claim 1, wherein:
    the first time period is used during a discontinuous mode;
    performing the evaluation further comprises performing the evaluation in response to the discontinuous mode; and
    the method further comprises:
    determining a third time period to be used during a continuous mode; and
    performing in response to the continuous mode another evaluation of the received radio frequency signal using measurements obtained within the third time period.

12. The method of claim 11, further comprising receiving a parameter corresponding to the third time period, and wherein determining a third time period further comprises determining the third time period using the parameter.

13. A computer program product tangibly embodying a program of machine-readable instructions executable by a digital processing apparatus to perform operations comprising:
    during a connected mode between a user equipment and a base station, the user equipment determining a first time period during which evaluation should be performed of whether a received radio frequency signal meets at least one criterion, the first time period based at least partially on a second time period of discontinuous reception or transmission, wherein the first time period is longer than the second time period;
    during the connected mode, the user equipment performing the evaluation of the received radio frequency signal using measurements obtained within the first time period;
    determining, based on the evaluation, whether an event should be triggered; and
    triggering the event in response to a determination that the event should be triggered.

14. The computer program product of claim 13, wherein the second time period corresponds to a time period of a discontinuous cycle.

15. The computer program product of claim 14, further comprising the operation of modifying the first time period in response to a modification of second the time period of the discontinuous cycle.

16. The computer program product of claim 13, wherein triggering the event comprises performing at least one of a measurement reporting operation, a cell reselection operation, or a handover operation.

17. The computer program product of claim 13, further comprising the operation of receiving a parameter corresponding to the second time period, and wherein the operation of determining a first time period further comprises the operation of determining the first time period using the parameter.

18. The computer program product of claim 13, wherein:
the first time period is used during a discontinuous mode;
the operation of performing the evaluation further comprises the operation of performing the evaluation in response to the discontinuous mode; and
the operations further comprise:
determining a third time period to be used during a continuous mode; and
performing in response to the continuous mode another evaluation of the received radio frequency signal using measurements obtained within the third time period.

19. An apparatus comprising:
at least one processor; and
at least one memory including computer program code,
the at least one memory and the computer program code configured to, with the at least one processor, cause the apparatus to perform at least the following:
during a connected mode between the apparatus and a base station, determine a first time period during which evaluation should be performed of whether a received radio frequency signal meets at least one criterion, the first time period based at least partially on a second time period of discontinuous reception or transmission, wherein the first time period is longer than the second time period;
during the connect mode, perform the evaluation of the received radio frequency signal using measurements obtained within the first time period; and
determine, based on the evaluation, whether an event should be triggered, and to trigger the event in response to a determination that the event should be triggered.

20. The apparatus of claim 19, wherein the at least one processor and at least one memory is formed on at least one integrated circuit.

21. The apparatus of claim 19, further comprising a transceiver having a connection suitable to connect an antenna, and at least one filter coupled to the transceiver, the at least one filter producing a filtered signal used as the received radio frequency signal.

22. The apparatus of claim 21, further comprising the antenna.

23. A method comprising:
in order to perform an evaluation during a connected mode between a user equipment and a base station of whether a received radio frequency signal meets at least one criterion, using a first time period for performing the evaluation in a continuous mode and a second time period for performing the evaluation in a discontinuous mode, wherein the second time period is based at least partially on a discontinuous period of reception or transmission occurring in the discontinuous mode and the second time period is longer than the discontinuous period of reception or transmission;
in response to being in the continuous mode, performing the evaluation of the received radio frequency signal using measurements corresponding to the first time period;
in response to being in the discontinuous mode, performing the evaluation of the received radio frequency signal using measurements corresponding to the second time period;
determining, based on the evaluation, whether an event should be triggered; and
triggering the event in response to a determination that the event should be triggered.

24. The method of claim 1, wherein:
determining the first time period further comprises determining the first time period during which evaluation for cell change evaluation purposes should be performed of whether a received radio frequency signal meets at least one criterion; and
the event is an event corresponding to the cell change evaluation.

25. The method of claim 24, wherein the first time period is a time-to-trigger period.

* * * * *